United States Patent [19]

Pees et al.

[11] Patent Number: 4,934,667
[45] Date of Patent: Jun. 19, 1990

[54] AIR SPRING DAMPER FOR VEHICLE SUSPENSION

[75] Inventors: James M. Pees, Centerville; Michael J. McClain, Dayton, both of Ohio

[73] Assignee: General Motors Corporation, Detroit, Mich.

[21] Appl. No.: 181,478

[22] Filed: Apr. 14, 1988

Related U.S. Application Data

[63] Continuation-in-part of Ser. No. 896,452, Aug. 13, 1986, abandoned.

[51] Int. Cl.⁵ .................................................. F16F 9/04
[52] U.S. Cl. ............................ 267/64.21; 267/64.24; 267/64.28; 267/64.27; 188/322.17; 188/322.18
[58] Field of Search .................... 188/322.17, 322.18, 188/322.16; 267/64.21, 64.17, 64.19, 64.23, 64.24, 64.28, 64.27, 122, 124, 129

[56] References Cited

U.S. PATENT DOCUMENTS

| | | | |
|---|---|---|---|
| 2,912,069 | 11/1959 | Dillenburger | 188/322.18 |
| 3,010,715 | 11/1961 | Slemmons et al. | 267/64.24 |
| 3,749,210 | 7/1963 | DeBaan et al. | 188/322.17 |
| 4,412,965 | 11/1983 | Thompson et al. | 264/257 |
| 4,722,516 | 2/1988 | Gregg | 267/64.27 |
| 4,741,517 | 5/1988 | Warmuth et al. | 267/64.24 |
| 4,763,883 | 8/1988 | Crabtree | 267/64.24 |

FOREIGN PATENT DOCUMENTS

| | | | |
|---|---|---|---|
| 632278 | 1/1962 | Italy | 267/64.27 |
| 14958 | 8/1963 | Japan | 267/64.27 |
| 112838 | 5/1966 | Japan | 188/322.18 |
| 136031 | 6/1986 | Japan | 188/322.17 |
| 248932 | 11/1986 | Japan | 188/322.17 |

Primary Examiner—George E. A. Halvosa
Assistant Examiner—Mark T. Le
Attorney, Agent, or Firm—A. Michael Tucker

[57] ABSTRACT

An air spring damper used in a vehicle suspension system with upper, intermediate and lower chambers and incorporating a reservoir tube which has an anti-friction rod guide and bearing assembly therein which lubricates the hollow rod of a piston as it strokes in their reservoir tube in jounce and rebound. An elastomeric air sleeve is featured which is connected to a top mount fastened to the vehicle body. An elastomeric isolator of this mount pivotally connects the piston rod to the body while sealing the upper end of the air sleeve. The air sleeve is supported full time by an outer elastomeric sleeve for improved air sleeve operation. A jounce bumper mounted internal of the reservoir tube is compressible to resist and cushion jounce strokes of the piston. This damper provides optimized vehicle body isolation and damping of both body and wheel axle at their natural frequencies.

32 Claims, 4 Drawing Sheets

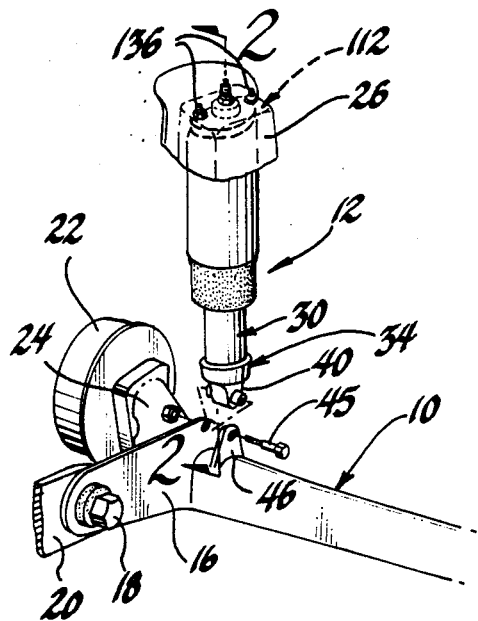
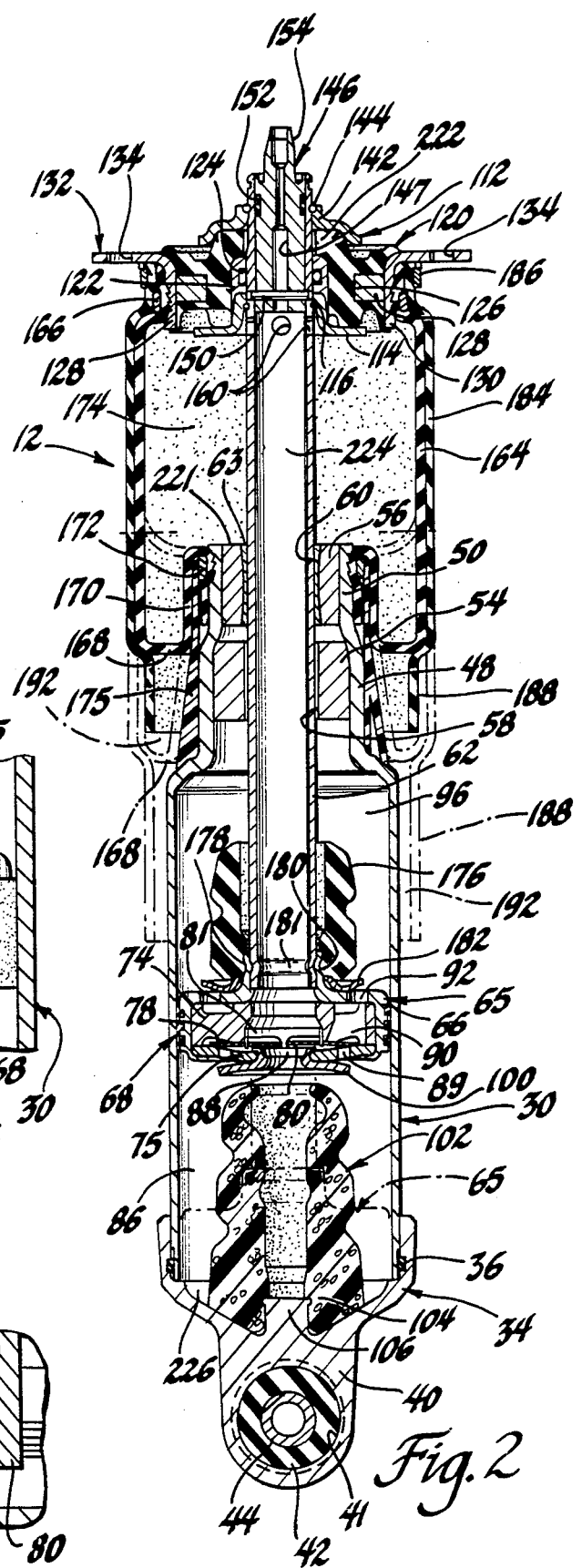
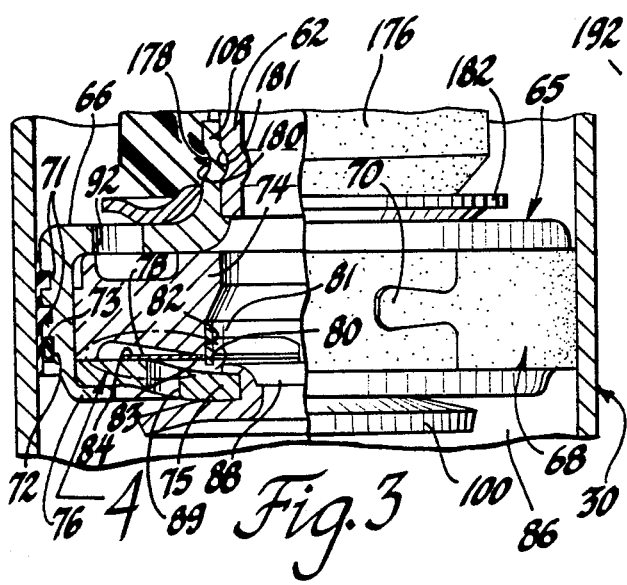
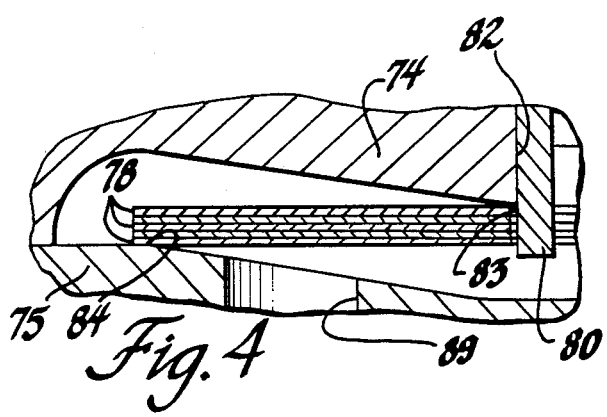
Fig. 1
Fig. 2
Fig. 3
Fig. 4

AIR SPRING DAMPER FOR VEHICLE SUSPENSION

This is a continuation-in-part of U.S. Pat. application Ser. No. 896,452, filed Aug. 13, 1986.

This invention relates to vehicle suspensions and more particularly to a new and improved air spring damper for optimized damping of the different and natural frequencies of the vehicle axle and the vehicle body and for improving pneumatic spring suspension of the vehicle body with respect to the axle.

This invention is drawn to a new and improved lightweight pneumatic spring suspension and spring suspension damper unit that provides improved isolation of the vehicle body with respect to the axle or other road wheel support and provides separation of the damping of the wheel axle and vehicle body. With this invention, air spring and frequency damping properties adapt to service load changes. The air spring damper of this invention can be employed in a height control system so that constant vehicle trim is readily obtained by adding and removing pressure air from the air suspension spring. Furthermore, there is a constant ride frequency with spring rate changing with pressure within the damper and constant relative damping with damping changing with pressure.

It is a feature, object and advantage of this invention to provide a new and improved air spring damper having frequency sensing damping with the air compressible above the natural frequency of the axle. Accordingly, above this natural frequency, the damper becomes a spring to store the vibratory energy while providing optimized isolation of the vibrations that would be transmitted through a suspension utilizing a mechanical or air spring combined with a hydraulic damper. This invention features high damping force at resonant or natural vibration frequencies and reduced damping force at other frequencies and particularly super critical frequencies so that vibratory energy is not fed into the body of the vehicle.

Another feature, object and advantage of this invention is to provide a new and improved air spring damper with upper, intermediate and lower chambers and incorporating a reservoir tube which has an anti-friction rod guide and bearing assembly therein which lubricates the rod of a piston as it strokes in the reservoir tube. An elastomeric air sleeve is featured which is connected to a top mount that pivotally connects the piston rod to the body while sealing the upper end of the air sleeve. The air sleeve is supported by an outer elastomeric sleeve for improved air sleeve support. The air sleeve and support sleeve being of a fabric reinforced elastomer material provide maximum corrosion resistance and because of their ability to flex retard buildup of mud, dirt, ice on the unit. Also because of their flexibility the air sleeve and support are self-compensating for side loading, lateral movements and air spring twisting. This construction is highly resistant to handling damage during manufacture, and damage in field use from stones, road debris and suspension interferences. Because of the elastomer construction, the air sleeve and support becomes a self-contained dirt seal at the top attachment. Furthermore, with the biased cord fabric reinforcement construction of each sleeve, pantographing (diameter change over pressure range) occurs which forms a natural dirt barrier below the operating air spring. A smaller diameter formed at the lower end of the support sleeve allows closer fit to the reservoir tube and the external piston thereon. The air sleeve and its support sleeve are natural noise insulators that retard transmission of noises such as generated by the vehicle suspension and roadway. There is also reduced spring rate and damping rate because of minimized change in effective area of the air spring as the unit strokes. This construction provides for a high pressure air spring such as 90 to 180 psi as compared to 40 to 100 psi on conventional units while meeting all durability and performance requirements. A jounce bumper mounted internal of the reservoir tube is compressible to resist and cushion jounce strokes of the piston.

It is another feature, object and advantage of this invention to provide improved vehicle control with maximum damping at natural axle or wheel support frequency which is limited by design and decreased damping beyond this point resulting in small travel of the body reduced by body mass acceleration. With this invention, there is a higher degree of damping which can be added at the natural frequency of the vehicle body for lower body mass resonant ratio.

Another feature, object and advantage of this invention is to provide for minimum required axle dampening with the minimum damping necessary force resulting in minimum body mass acceleration.

Another object, feature and advantage of this invention is to provide an orifice restrictor formed from valve plates whose size as provided by the thickness and number of plates determines the frequency that maximum damping occurs. With this invention, the size does not change maximum work. Also, the orifice preload can be increased to increase body damping. There is low internal friction with this invention. Weight and size reduction are featured with the air spring and damper being unitized in a small lightweight package as compared to other suspension.

These and other features, objects and advantages will become more apparent from the following detailed description and drawing in which:

FIG. 1 is an isometric, partially exploded view of a portion of a rear suspension of a vehicle.

FIG. 2 is a cross-sectional view of a gas spring suspension and damper unit employed in the suspension of FIG. 1 and taken along lines 2—2 of FIG. 1.

FIG. 3 is an enlarged view partly in elevation and partly in cross section of a portion of the air spring damper of FIG. 2 illustrating the piston assembly of this unit.

FIG. 4 is an enlarged view of a portion of the piston valving taken from the encircled area 4 of FIG. 3.

Figure 5:
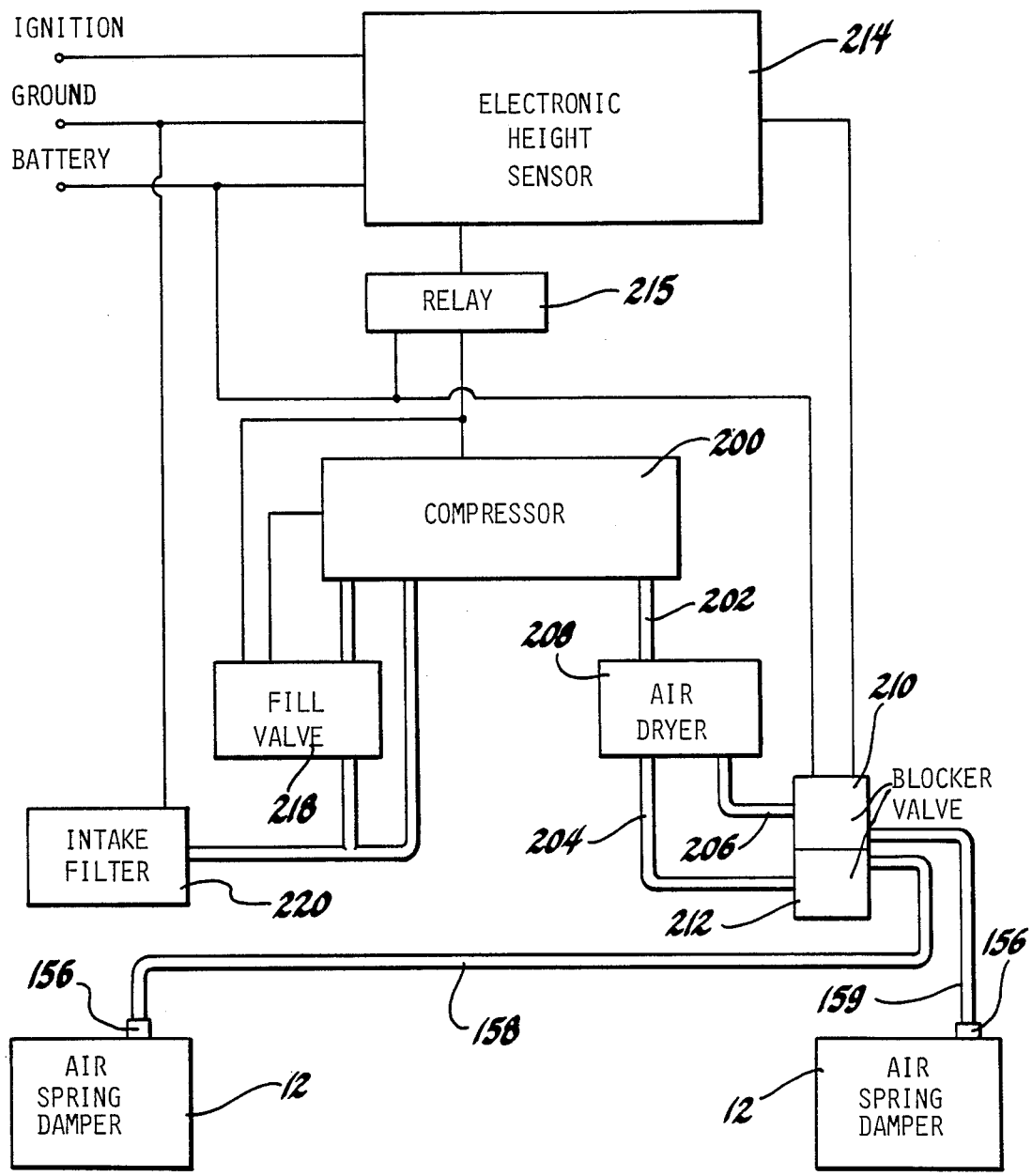
FIG. 5 is a diagrammatical view of the air spring damper control system of this invention.

Turning now in greater detail to the drawing, there is shown in FIG. 1, the right side of a trailing arm type rear axle 10 with an air spring damper 12 providing the suspension of the right rear corner of an automotive vehicle. The left side of the axle and the associated left rear corner air spring damper 12, diagrammatically shown in FIG. 5, are substantially the same as the right side components. Two control or trailing arms, with only right arm 16 being shown, are welded to the axle 10 and extend forwardly therefrom into pivot connection by pivot bolt 18 with support structure 20 connected with the vehicle body. A right rear wheel drum 22 for mounting a conventional road wheel is operatively secured by drum support 24 at the end of the axle. Support for the left rear wheel drum is substantially the same as the right rear wheel drum. The control arms with the identical right and left air spring dampers 12, 12 as well as an optional track bar, not shown, maintain the geometrical relationship of the rear axle with respect to the vehicle body partially shown at 26 as part of the mounting tower. The air spring dampers provide for optimized handling characteristics by damping the differing natural frequencies of the axle and the body of the vehicle during vehicle operation as well as by controlling vehicle roll such as when cornering. Each air spring damper has a one-piece bottle-shaped reservoir tube 30 formed from aluminum or other suitable material. The reservoir tube has a lower end annularly welded or otherwise secured in an air-tight manner to a base cup 34. O-ring seal 36, disposed between the outside diameter of the reservoir tube and the inside diameter of the base cup, also prevents leakage of air from the interior of the air spring damper. The base cup 34 has a depending lower mount 40 with a transverse cylindrical opening 41 which receives elastomeric isolator 42 preloaded between the wall of opening 41 and an internal cylindrical bearing sleeve 44. This preloaded rubber-like isolator resiliently deflects to absorb vibratory energy and has long service life from the preload. The sleeve 44 receives a pivot bolt 45 which pivotally secures the air spring damper 12 to the axle by way of the trailing arm 16 and a laterally spaced support 46 projecting upwardly from the top of the axle.

From the base cup 36, the reservoir tube 30 extends upwardly as a cylindrical main body about two-thirds of its overall length where it is double-stepped diametrically down as shown at 48 and 50 along the upper one-third of its length. The intermediate step 48 carries a cylindrical metallic rebound stop 54 secured thereto while the upper and smallest diameter step has a cylindrical metallic rod guide 56 secured to the inner wall thereof. The rebound stop 54 and rod guide 56 have aligned centralized, cylindrical openings 58 and 60 to accommodate a hollow cylindrical piston rod 62 slidably mounted therein. To eliminate looseness and play between the rod guide 56 and the piston rod 62 an elongated cylindrical anti-friction bearing 63 is press-fitted onto the inner wall defining the rod guide opening 60. The bearing 63 has its interior formed from sintered bronze and Teflon, polytetrafluroethylene and when installed in the rod guide provides a low friction bearing for the rod guide. The molecules of the Teflon are aligned with the direction of piston rod travel for reduced friction. As the rod guide strokes in this bearing, the bronze heats the entrapped Teflon so that it partially liquefies and flows for increased lubricity to further reduce sliding friction. The central opening 60 of the rod guide is preferably slightly flared at the ends thereof to accommodate motions of the piston rod during operation and to facilitate installation of the bronze-Teflon bearing 63.

Figure 8:
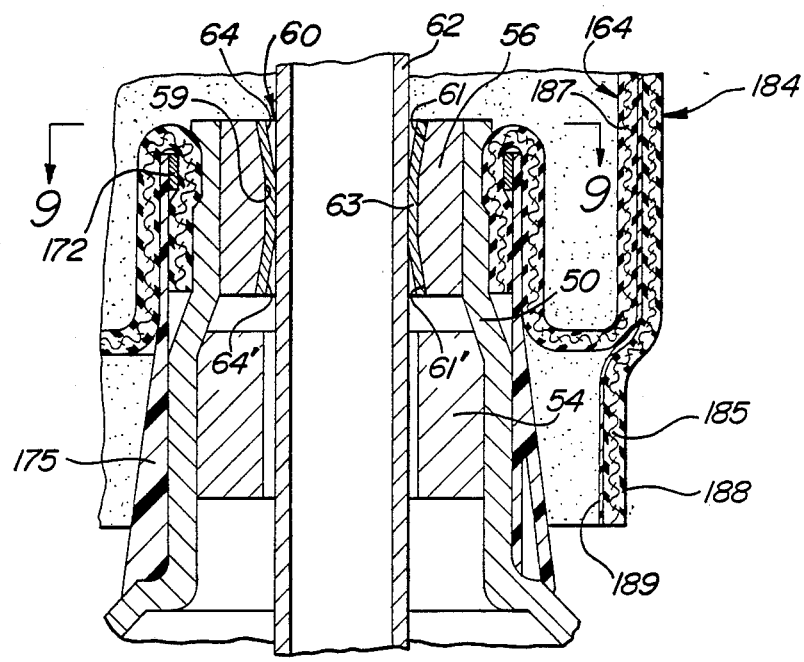
FIG. 8 is an enlarged view of a central portion of FIG. 2.
Figure 9:
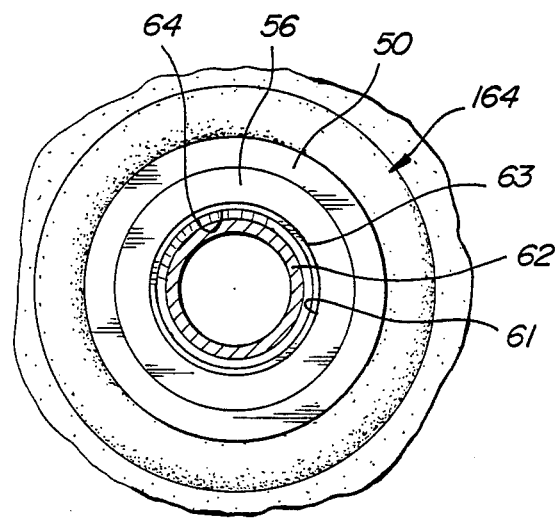
FIG. 9 is a top plan view taken generally along 9—9 of FIG. 8.

In a preferred construction, shown in FIG. 8, the rod guide opening 60 has a centralized center section defined by cylindrical wall 59 and upper and lower sections defined by conical walls 61, 61' which provide large diameter openings. Also as illustrated in FIG. 8, the sleeve-like rod guide bearing 63 is flared after insertion into the rod guide body to conform to the shape of rod guide opening 60 so that the rod guide bearing, mechanically trapped in place on the rod guide 56 and the coned inner bearing surfaces 64, 64' thereof, slidably supports and compensates for any tilting of the piston rod with respect to the rod guide such as might occur during jounce or rebound.

Secured to the lower end of the tubular piston rod 62 is a valved piston assembly 65 which includes a generally cylindrical shell 66 dimensioned to slidably fit within the reservoir tube. More particularly, the piston shell 66 carries an overlapping band type annular seal 68 of graphite filled Teflon or other suitable anti-friction material. The band has its free ends mortised by the tongue and slot connection 70 shown in FIG. 3. The piston shell 66 has three annular grooves on the outside diameter, the upper two of which receive the inwardly extending rectilinear ridges 71 of the seal 68 to connect the band to the shell. An internal O-ring 72 of a resilient elastomer material mounted in a lower groove 73 in the shell contacts the interior surface of a lower skirt portion of the relatively wide seal 68 to provide a radial spring for urging the seal radially outwardly into 360 degrees sealing and sliding contact with the inner wall of the reservoir tube 30. This provides for optimized piston reservoir sealing as compared to prior band type seals of this type.

The piston assembly has an orifice plate 74 trapped within the shell 66 by a lower dished carrier plate 75 that is retained in position by the spun over lower annular lower edge 76 of the shell. Operatively mounted between the orifice plate 74 and the carrier plate 75 are a plurality washer-like valve disks 78, best shown in FIG. 4, which are subjected to deflection when stroked for metering the flow of air through the orifice plate 74 and the carrier plate 75 to damp the jounce and rebound action of the air spring damper 12.

More particularly, the valve disks 78 are thin, metallic spring washer members which have central openings that fit on downwardly extending and radially spaced fingers 80 of a cylindrical support 81 pressed into the central opening 82 of the orifice plate 74. The uppermost of the valve disks 78 sealingly seat against the annular inner shoulder 83 of the orifice plate and extend outwardly onto a lower annular seating surface 84 of the carrier plate 75 to block the flow of air through the piston assembly 65 when not moving in jounce or rebound motion.

On jounce, the piston strokes into the reservoir and the spring disks 78 deflect upwardly at the outside diameter, shown in FIG. 4, to restrict and meter the flow of air from the contracting lower chamber 86 through central passages 88 and radial outer passages 89 in the carrier plate 75, past the shoulder 84, the orifice plate passage 90 and through the upper openings 92 in the piston shell 66 and to expanding intermediate chamber 96 above the piston.

On rebound when the air spring damper is elongating, air in the collapsing intermediate chamber 96 is forced through the piston to deflect the inner diameter of the disks 78 downwardly away from shoulder 83. When the disks deflect, air is metered into the lower chamber 86.

The restriction of flow provided by the spring disks checks the jounce and rebound spring action to provide improved vehicle control and occupant comfort.

The carrier 75 mounted to the lower end of the piston 65 carries a conical washer-like contact plate 100 which engages the upper end of the centrally cored and generally cylindrical jounce bumper 102 of microcellular resilient foam material of urethane or other suitable material. The bumper 102 is a multi-lobed or ribbed member which has a reduced lower end 104 that closely fits in the base cup 34 and is centrally mounted on an upwardly extending stud 106 that projects from the base cup. As the damper contracts or collapses in jounce, the jounce bumper 102 is compressed to a fraction of its undeflected size to control and cushion jounce action. At full jounce as indicated by the dotted line position of the piston assembly 65, the jounce bumper is fully compressed to effectively cushion large jounce motions.

The piston shell 66 has an upstanding neck 108 secured to the lower end of the tubular piston rod 62. The piston rod 62 extends upwardly from the neck through the rebound stop 54 and rod guide bearing 63 into operative connection with the sprung portion of the vehicle, through a top or upper mount assembly 112. The top mount assembly isolates and provides a limited pivotal connection joining the piston rod with the sprung portion of the vehicle.

The top or upper mount assembly 112 isolates the piston rod from the vehicle body so that vibrations are not transmitted to the interior of the vehicle. The upper mount is an effective pivot connection for the piston rod and serves as an upper seal for the air spring which is clamped directly thereto. The mount assembly is seated on a metallic rate washer 114 fixed from downward axial movement on piston rod 62 by a hog-ring 116 fitted in a groove in the upper end of the piston rod 62. The top mount assembly comprises a generally torrous-like main isolator body 120 of a resilient elastomer having at its internal diameter a generally cylindrical and metallic connector 122 which is bonded to the interfacing internal wall of the isolator body. An O-ring 124 between the connector 122 and piston rod 62 prevents the escape of gas from the interior of the gas spring hereinafter described.

The main isolator body 120 is grooved at 126 to carry a thick washer-like connector ring 128 that is secured to the depending neck 130 of a mounting plate 132. The top flange of this mounting plate has openings 134 which receive threaded fasteners 136 that secure the top mount assembly 112 to the mounting tower 26 or other body work of the vehicle. The elastomer isolator body 120 is preloaded as it is held in place between the lower rate washer 114 and an upper washer-like retainer 142 held in fixed position by a hog-ring 144 seated in an upper annular groove in the piston rod.

An air fitting 146, having a centralized axially extending air passage 147 leading to the interior of the piston rod, is fitted into the upper end of the piston rod and is secured in position by cross pin 150. O-ring seals 152, operatively disposed between the cylindrical main body of the fitting and the internal wall of the piston rod, block the escape of pressure air from the air spring provided by this unit as will be described below. The upper end 154 of the air fitting 146 receives a mating fitting 156 of the air lines 158 or 159 of the height control system diagrammatically illustrated in FIG. 5.

The piston rod has openings 160 formed therein just under the rate washer 114 which in conjunction with the air passage 147 in the fitting 146 provide pneumatic communication with the air suspension spring formed by elastomeric air sleeve 164 with internal woven fabric reinforcement such as described in U.S. Pat. No. 4,412,965 or in United Kingdom patents No. 873,348, published Jul. 26, 1961 and No. 1,446,448, published Aug. 18, 1976, the disclosures of which are hereby incorporated by reference. The sleeve 164 is a generally cylindrical unit having its upper end secured in air-tight fashion to the neck 130 of the mounting plate by constricted ring 166. From this connection, the elastomeric sleeve 164 extends downwardly to a reversely curved rolling lobe 168 and from the rolling lobe 168 upwardly as a smaller diameter inner portion 170 into a terminal air-tight connection with the upper extremity 50 of the reservoir tube by constriction of a retainer ring 172.

With the air tight connection of the sleeve 164 to the reservoir tube and the top mount, an air spring chamber 174 is formed which when supplied with sufficient pressure air from the control system of FIG. 5 or from any suitable source provides the air spring suspension and effective isolation of the vehicle body represented by the tower 26 from the axle 10 of the vehicle. The air spring sleeve rolls along the outer surface of a profiled contact piston 175 which is generally cylindrical and has increased diameter as the lobe rolls toward its full jounce position as shown in the lower dotted lines in FIG. 2 so that spring rate can be selected as needed. This piston 175 slip fits over the stepped upper portions of the reservoir tube for good support of the air spring. Importantly, the upper end of the piston 175 covers the retainer ring 172 so that the ring cannot contact and wear the air sleeve. The piston is of a hard plastics material and provides an optimized surface to accommodate the rolling lobe with reduced friction.

The air spring and damper unit of this invention incorporates a cylindrical rebound bumper 176 of resilient elastomeric material that fits around the piston rod 62 and is formed with an internal attachment ring 178 that resiliently fits in a groove 180 rolled in the upstanding neck of piston shell 66 which in turn interlocks with an annular groove 181 in the lower end of the piston rod. The rolled grooves securely connect the piston shell to the end of the piston rod as best shown in FIG. 3. Operatively disposed around the piston rod 62 and between the lower end of the rebound bumper and the upper surface of the piston shell is a rate washer 182 which assists in controlling the rate of the rebound bumper as it deflects on contact with the rebound stop 54 when the unit is in rebound Resistance to rebound is cushioned and progressively increased by the rebound bumper as the damper strokes to full rebound.

While this invention may incorporate rigid outer support tubes of metal or plastic to provide fixed radial support of the elastomeric air spring sleeve 164, the preferred embodiment of this invention has a radially resilient support sleeve 184 for full time support of the air sleeve. This support sleeve 184 is similar to the air spring sleeve 164 and therefore preferably is a cord reinforced elastomer cylinder.

With this full time support, air pressure inside of the air sleeve can be materially increased as compared to an unsupported air sleeve so that the air spring damper can handle substantially larger loads. To decrease friction between the walls of the air sleeve and the support sleeve, the interior surface of the support sleeve is provided with a polyurethane coat 189. This anti-friction coat reduces or eliminates galling and other frictional wear of the elastomer components to increase service life. Even without the polyurethane coat 189, any rubbing and chafing between the contact surfaces of air sleeve 164 and support sleeve 184 is acceptable because the fabric reinforcements 185 and 187 of both are capable of pantagraphing during damper operation.

Figure 10:
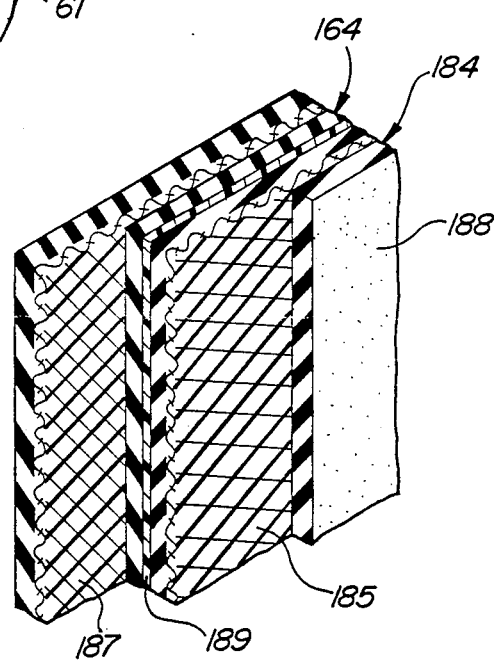
FIG. 10 is a pictorial projection of a portion of the elastomer air spring sleeve and its resilient elastomeric support sleeve of the air spring damper of this invention.

FIG. 10 shows the support sleeve 184 with the cords of the fabric reinforcement 185 having a low cord angle such as 20° cord angle. The cord angle of the fabric reinforcement 187 of the air sleeve 164 is at a 60° cord angle. With this construction, the outer sleeve provides strengthened radial support of the air sleeve since it provides increased resistance in the radial direction as compared to the air sleeve with the higher cord angle.

The support sleeve 184 is tightly secured at its upper end and around the upper end of the air spring sleeve 164 by a constricted band 186. From the top connection provided by band 186, the cylindrical resilient support sleeve 184 extends downwardly along and in contact with the outside of the air spring sleeve 164 to provide a reduced diameter terminal end 188 below the rolling lobe 168. The support sleeve is of a reduced diameter as compared to the air sleeve and is sized to expand and contract with the air sleeve as the air sleeve diametrically changes during jounce and rebound. Thus, the support sleeve 184, in contrast to a fixed diameter sleeve, contracts with the air sleeve during rebound and expands during jounce to provide full time support of the air sleeve as best shown in FIG. 2 for optimized durability and improved air spring performance.

Additionally the full time support provided by the sleeve 184 permits the use of different air sleeve cord sizes, build angles, and wall thicknesses for operation over a wide range of operating pressures. There can be a variable restraining diameter over a pressure range since the corded construction of the support sleeve permits diameter changes at varying parts of the sleeve. Such a variable restraining diameter reduces internal stress of the air spring and supports the air spring over wide range of operating pressures without reducing effective area for maximum lift capability. In contrast, a fixed diameter restraining member restricts air spring expansions and thus restricts increase effective area for additional lift capabilities.

Vehicle cornering is improved since the outside air spring experiences increased roll pressure and the support sleeve optimizes the strength of the air sleeve by full support during this action. The reduced diameter opposing air spring is also fully supported by its sleeve 184. Accordingly, since roll stiffness is increased, a stabilizer bar is not needed with the air spring damper suspension.

The lower end 188 of the support sleeve 184 which appears below the rolling lobe which increases and decreases in height as the damper strokes. This lower end 188 has a constricted undeflected diameter designed therein which is less than the outside diameter of the rolling lobe. With this construction, a reduced diameter restricted passage 192 is provided between the support sleeve and the reservoir tube to minimize the entry of foreign matter to the interior of the support sleeve to reduce abrasion and wear of the support sleeve and the air spring sleeve.

FIG. 5 diagrammatically illustrates an electronically controlled leveling system incorporating the air spring damper units 12, 12 adjacent opposite outboard ends of the rear axle 10. The system comprises an electric motor driven, single piston type air compressor 200 that provides pressure air through lines 202, 204, 206, 158 and 159 to the air spring dampers 12, 12 at the rear corners of the vehicle to raise and lower the rear suspension. This maintains trim height under varying loading conditions and the units provide rear damping. An air dryer 208 operatively interposed in the lines between the compressor and air spring dampers 12, 12 contains a desiccant to remove water and water vapor from the compressed air before the air flows to the air spring dampers 12, 12.

Blocker valves 210 and 212 pneumatically connected between the air dryer and the air spring dampers are normally closed to inhibit reverse flow from the air spring dampers. These valves are electrically activated by signals from an electronic height sensor 214 supplied with battery and ignition input voltages. The blocker valves also mechanically open at a predetermined pressure differential when the compressor 200 is running to limit the pressure of air supplied to the dampers. The electronic height sensor is a solid state device which electronically detects the height of the car and effects energization of the compressor 200 through relay 215 to keep the vehicle in trim by increasing the supply of pressure air to the air spring dampers. A rotatable shutter interrupts internally produced light beams to detect this trim height. The turning motion for this is provided by a lever and arm which is operatively connected to the axle 10 by an articulated link. An exhaust solenoid is located in the compressor and exhaust air from the dampers when energized by the height sensor to lower the body to trim height. A normally open and electrically activated fill valve closes to seal the compressor head when the compressor is running. Air supplied to the compressor is through an intake filter 220 which filters air before it enters the compressor head. This filter also provides the exit for air being exhausted when the exhaust solenoid is activated.

With this invention, there is automatic resistance to vehicle roll since the air spring damper resisting the roll will increase in pressure and spring rate while the opposing damper will decrease in pressure spring rate.

Figure 6:
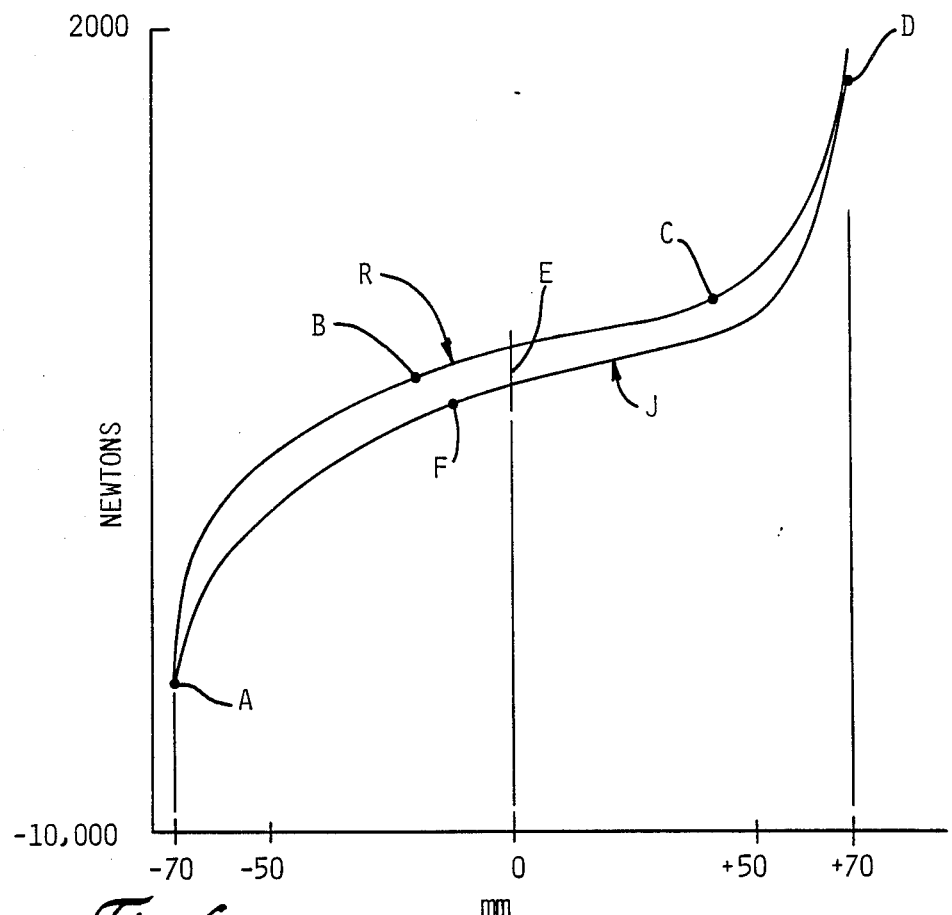
FIG. 6 is a curve illustrating jounce and rebound of the air spring damper of FIG. 1.

The hysteresis curve of FIG. 6 is exemplary of the energy management action of the air spring damper 12 during jounce and rebound. At point A on the jounce or load side J of the curve, the jounce bumper 102 is fully compressed and the piston 65 is in the phantom line FIG. 2 position. From this point, the rebound or unloaded side R of the curve is generated as the spring damper elongates in rebound action. At point B on the rebound side R, the contact member 100 of the piston moves off of the expanding jounce bumper and the rebound side of the curve flattens out. Rebound action is controlled with damping provided by the restriction provided by the flexed internal diameter of the valve disks 78 as the air is forced by piston 65 from the center chamber 96 to the lower chamber 86. Air in the lower chamber 86 can flow through the passage 224 provided by hollow piston rod and through the cross opening 160 therein to air spring chamber 174. At point C, the elastomer rebound bumper 176 contacts the rebound stop 54 and is deflected to increase resistance to rebound. At point D, the rebound stop has fully deflected the rebound bumper and rebound action is thus cushioned and terminated. Jounce action is the load side of the curve and from point D, the air spring damper telescopes together and damping is provided by the restriction as defined by the deflected outer diameter of the disks and surface 84 of carrier plate 75. Air is metered from the contracting lower chamber 86 to the expanding intermediate chamber 96 through the piston as the piston moves further into the reservoir. After passing the static vehicle position E, zero mm on the abscissa of the curve, the contact plat 100 strikes the upper end of the jounce bumper 102. This contact may occur at point F and the jounce bumper provides progressive resistance to jounce action and effectively stores jounce energy as it collapses and constricts to the small space 226 below the piston 65 at full jounce as shown in phantom line position. At full jounce, the piston has stroked 70 mm in the negative direction past the static car position E and the upper end 221 of the reservoir tube has contacted the lower end of the rate washer 114. The last jounce travel is effectively cushioned by the inner collar portion 222 of the isolator 120.

Figure 7:
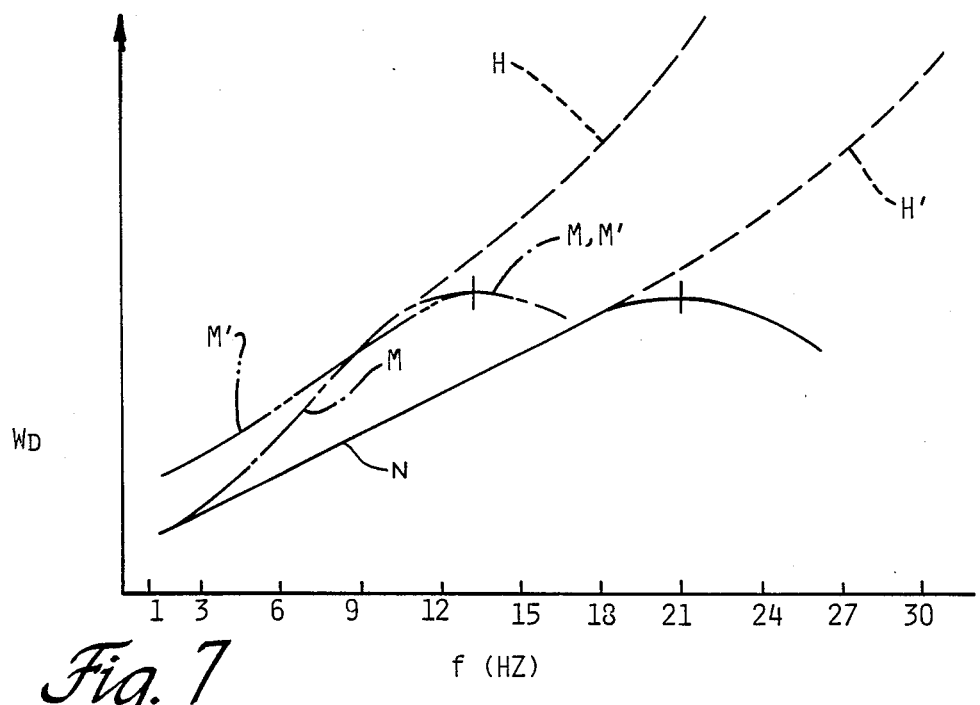
FIG. 7 is another curve illustrating operation of the air spring damper of FIG. 1.

FIG. 7 are curves illustrating operation of the air spring damper of this invention in damping the differing natural frequencies of the axle and body and further shows how the damper acts as a spring at frequencies higher than the natural frequency and differs from the action of a hydraulic damper at these higher frequencies. The ordinate $W_D$ is work in joules and the abscissa is frequency in Hertz. Curve M shows operation of the damper with five disks having a predetermined overall thickness and spring rate. The natural frequency of the body is one Hz and there is effective body damping. This body damping can be readily increased by increasing the preload on the valve disks 78. This can be done by increasing the thickness of the carrier plate 75. With increased preload, the damping work $W_D$ at the one Hz natural frequency is substantially increased as shown by curve M'. The natural frequency of the axle is 12 Hz and curves M and M' show optimized damping of the axle. At frequencies higher than the natural frequency of 12 Hz, the curves M and M' droop to illustrate the spring action of the damper. This action is contrasted to that of a hydraulic damper whose action beyond the 12 Hz natural frequencies is illustrated by curve H. As axle frequency increases, a hydraulic lock will occur in a hydraulic damper and the excitations are fed into the body of the vehicle to detract from comfort of the occupants in the vehicle and to detract from vehicle control. Curve N illustrates damping work done with five valve plates 78 having a reduced overall thickness as compared to that of the first example and illustrated by curves M, M'. Since maximum damping with this valve sizing occurs at about 20 Hz, this valving is not as effective as the first example curves M or M'. The super critical frequencies above the 12 Hz natural frequency of the axle up to 20 Hz will be fed into the body of the vehicle detracting from comfort and vehicle handling. After reaching 20 Hz, the damper acts as a spring to store energy. While the second example is not as effective as the first example, it offers improvement over a hydraulic unit which would hydraulically lock and feed the higher frequency into the body as shown by curve H'. Body damping can be increased by increasing preload of the valve as in the first example.

While the air spring damper has been shown and described as damping natural axle frequency, it will be appreciated that the axle can be any structure supporting a road wheel. Also any suitable gas can be used instead of air.

The embodiments of the invention in which an exclusive property or privilege is claimed are defined as follows:

1. An air spring damper for the suspension of a vehicle body with respect to a support for a road wheel and for damping the natural frequency of the road wheel support and the natural frequency of the vehicle body comprising, an elongated reservoir tube having a pressurized air therein, means attaching a lower end portion of said reservoir tube to said road wheel support, a valved piston mounted for reciprocating jounce and rebound stroking movement within said reservoir tube defining intermediate and lower air chambers and restricting the flow of air therethrough to dissipate the energy of the natural frequency of said wheel support and the differing natural frequency of said body, a top mount attached to said body, a piston rod attached to said piston and extending from said reservoir tube into connection with said top mount, elastomeric air spring means having a rolling lobe and defining an upper air chamber extending around said piston rod and operatively mounted between the upper end of said reservoir tube and said top mount for rolling movement thereon, rod guide and rod guide bearing means slidably receiving said piston rod and closing the upper end of said reservoir tube, air passage means within said piston rod and said piston for pneumatically connecting said upper and lower chambers, and means for supplying pressurized air to said air passage means to effect the air spring suspension of said body with respect to said wheel support.

2. The air spring damper of claim 1 and further comprising a resilient outer support sleeve providing full time support of said air spring means including full time circumferential support during jounce and rebound motions.

3. The air spring damper of claim 1 and further comprising retainer means connecting said air spring means to the upper portion of said reservoir tube and piston means mounted over said retainer means and said reservoir tube to define a varying diameter surface for said rolling lobe to change the spring rate of said air spring as said damper moves in jounce and rebound.

4. The air spring damper of claim 1 wherein said piston rod is hollow and pneumatically interconnects said upper and lower chambers so that pressurized air in said upper and lower chambers exerts a lifting force on said piston to supplement the lifting force exerted on said top mount and said body by the pressure in said upper chamber.

5. The air spring damper of claim 1 wherein said valved piston is comprised of a piston shell, an orifice plate housed in said shell and a plurality of valve disks mounted in said orifice plate having inner and outer diameters deflectable to meter and restrict the flow of air through said piston on jounce and rebound stroking movement of said piston.

6. The air spring damper of claim 1 wherein said valved piston includes a piston shell attached to the lower end of said piston rod, a band-like seal carried by said piston shell along the outer periphery thereof for sliding and sealing contact with the inner wall of said reservoir tube, said seal having a skirt portion providing annular contact with the inner wall of said reservoir tube and spring means interposed between said piston shell and said skirt portion for resiliently urging said skirt portion into close annular sealing and sliding contact with said inner wall of the reservoir tube.

7. The air spring damper of claim 1 wherein said rod guide bearing means is a sleeve of sintered bronze and Teflon material and wherein said Teflon has molecules aligned with the direction of rod travel to reduce sliding friction.

8. The air spring damper of claim 1, wherein said rod guide and rod guide bearing means have flared upper and lower openings to accommodate rocking of said piston rod during jounce and rebound action of the damper and said rod guide bearing means is a sleeve pressed into said rod guide and has a sintered bronze and Teflon coating material on the inner wall thereof to provide improved anti-friction sliding engagement with said rod by liquefying when the bronze heats to a predetermined temperature from frictional sliding engagement with said piston rod.

9. The air spring damper of claim 1 wherein said top mount includes an elastomeric annulus which isolates the piston rod from the body and pivotally connects said piston rod to the body, and clamping means securing said air spring means to said top mount to seal the top of the air spring means and rate washer means carried by said piston for contact with said annulus to cushion the last travel of the damper in rebound.

10. An air spring damper for the suspension of a vehicle body with respect to a support for a road wheel and for damping the natural frequency of the road wheel support and the lower natural frequency of the vehicle body comprising, an elongated reservoir tube having a pressurized air therein, means attaching a lower end portion of said reservoir tube to said road wheel support, a piston mounted for reciprocating jounce and rebound stroking movement within said reservoir tube, valve disk means operatively mounted in said piston and deflectable to restrict the flow of air therethrough to optimize damping of the natural frequency of said wheel support and provide diminishing dissipation of energy of wheel support frequency beyond said natural frequency and to further damp the lower natural frequency of said body, a piston rod attached to said piston and extending from said reservoir tube, elastomeric air spring means operatively mounted above said reservoir tube for rolling movement thereon, rod guide and rod guide bearing means slidably receiving said piston rod and closing the upper end of said reservoir tube, passage means within said piston rod for admitting pressurized air to said air spring means and said reservoir tube to effect the air spring suspension of said body with respect to said wheel support, and said passage means interconnecting the air spring means and said reservoir tube.

11. The air spring damper of claim 10 and further comprising an elastomeric outer support sleeve contacting the outer periphery of said elastomeric air spring means providing full time support of said air spring means including jounce and rebound motion 12. The air spring damper of claim 10 and further comprising an upper mount with an elastomeric isolator connecting said piston rod to said body to vibrationally isolate said piston rod from said body and to serve as a pivot for said piston rod and to provide an upper seal for said air spring means.

13. The air spring damper of claim 10 wherein said reservoir attaching means is a base cup and further comprising a jounce bumper of a compressible and resilient material mounted in said reservoir tube below said piston to provide increasing resistance to jounce and constrictable into said base cup connecting said reservoir tube to said wheel support at full jounce.

14. An air spring damper for the suspension of a vehicle body with respect to a support for a road wheel and for damping the natural frequency of the road wheel support structure and the natural frequency of the vehicle body comprising, an elongated reservoir tube having a pressurized air therein, base cup means attaching a lower end portion of said reservoir tube to said road wheel support a valved piston mounted for reciprocating stroking movement within said reservoir tube during jounce and rebound strokes and restricting the flow of air therethrough to dissipate the energy of the natural frequency of said wheel support and the differing natural frequency of said body, a piston rod attached to said piston and extending from said reservoir tube, cylindrical elastomeric air spring means operatively mounted above said reservoir tube for rolling movement thereon, rod guide and rod guide bearing means slidably receiving said piston rod and closing the upper end of said reservoir tube, air passage means in said piston rod for admitting pressurized air to said air spring means and said reservoir tube to effect the air spring suspension of said body with respect to said wheel support, and said passage means interconnecting the air spring means and said reservoir tube.

15. The air spring damper of claim 14 and further comprising a resilient outer support sleeve providing full time diametrical support of said air spring means including jounce and rebound motion.

16. The air spring damper of claim 14 in which said rod guide bearing is a lubricating thin-walled tubular sleeve pressed into said rod guide to provide lubricated support of said piston rod as it moves in jounce and rebound.

17. The air spring damper of claim 14 and further including an elastomeric upper mount connected to said vehicle body and preloaded between upper and lower supports affixed to said piston rod.

18. A suspension device for a vehicle comprising:
(a) a damper having relatively movable telescopic parts including a rigid tubular member and a piston assembly mounted for stroking movement therein, a piston rod connected to said piston assembly and extending therefrom and through one end of said tubular member,
(b) a resilient tubular rolling-lobe air spring member disposed around at least a part of the length of the rigid tubular member, said air spring having
  i a tubular inner wall portion with a first terminal end that defines a lower extremity of said air spring member,
  ii and a tubular outer wall portion spaced from the inner wall portion with a second terminal end that defines an upper extremity of said air spring member, and
  iii a rolling lobe portion interconnecting said inner and outer wall portions, said rolling lobe portion being movable on reciprocal movement of said piston and piston rod relative to said rigid tubular member,
(c) first fastener means securing said first terminal end of said tubular inner wall in an air tight manner with respect to said rigid tubular member,
(d) second fastener means securing said second terminal end of said tubular outer wall in an air tight manner with respect to said piston rod so that said air spring member forms a closed fluid pressure receiving chamber surrounding a major part of said damper for receiving air under pressure to thereby provide an air spring, said air spring yieldably resisting telescopic movement of said damper on admission of fluid pressure into said chamber, (e) fluid supply means for supplying pressure to and from said chamber, and (f) a radially resilient support tube having full time contact with said outer wall portion of said air spring member for the radial support thereof, said support tube including a lower constricted end portion which has a diameter less than the diameter of said tubular outer wall portions, said support tube terminating in a first end secured adjacent said second fastening means and in a second end extending beyond the travel range of said rolling lobe portion and remaining substantially undeflected to support an outer surface of said rolling lobe portion.

19. An air adjustable suspension spring and damper for a vehicle suspension and for operatively interconnecting sprung and unsprung vehicle masses comprising:

(a) support tube means operatively connected to one of said vehicle masses, (b) a valved piston assembly mounted within the confines of said support tube means for stroking movement therein to restrict the flow of working fluid therethrough and thereby control the spring action of the vehicle suspension, (c) piston rod means connected to said piston assembly and extending therefrom through at least one end of said support tube, (d) a first tubular sleeve of radially resilient material for an air suspension spring, (e) fastener means operatively connecting said first tubular sleeve at one end thereof in an airtight manners with respect to said support tube means, (f) mounting means for connecting said piston rod to the other of said vehicle masses, (g) second fastener means for operatively connecting the other end of said first tubular sleeve to said mounting means, (h) a second tubular sleeve of radially resilient material including as lower constricted end portion that has a diameter less than the diameter of said first tubular sleeve, said second tubular sleeve having a first end secured with respect to one of said vehicle masses and encompassing a portion of said first tubular sleeve to provide full time engagement and resilient radial support of said first tubular sleeve when said first tubular sleeve is air pressurized and operating as a spring suspension, said second tube having a second end terminating in an undeflected end extending beyond said first tubular sleeve.

20. An air adjustable suspension spring and a suspension spring damper integrated therewith for operatively interconnecting sprung and unsprung masses of a vehicle comprising:

(a) support tube means operatively connected to one of said vehicle masses, (b) a valved piston assembly mounted within the confines of said support tube means for stroking movement therein to restrict the flow of working fluid therethrough and thereby control the spring action of the vehicle suspension, (c) piston rod means connected to said piston assembly and extending therefrom through at least one end of said support tube, (d) a first tubular sleeve of a radially elastomeric material for an air suspension spring, (e) fastener means operatively connecting said first tubular sleeve at one end thereof in an airtight manner with respect to said support tube means, (f) mounting means for connecting said piston rod to the other of said vehicle masses, (g) second fastener means for operatively connecting the other end of said first tubular sleeve to said mounting means, (h) a second tubular sleeve of a radially elastomeric material having one end secured with respect to said vehicle mounting means and encompassing a portion of said first tubular sleeve to provide full time engagement and resilient support of said first tubular sleeve when said first tubular sleeve is air pressurized and operating as a spring suspension, said second tube having a second end terminating in an undeflected end extending beyond said first tubular sleeve, said second end having a diameter less than the diameter of the first tubular sleeve.

21. The suspension device as specified in claim 18 wherein the support tube second end is undeflected.

22. The suspension device as specified in claim 18 wherein the support tube is formed from a fabric reinforced radially elastomeric material.

23. The suspension device as specified in claim 22 wherein the air spring member outer wall is formed from a fabric reinforced radially elastomeric material.

24. The suspension device as specified in claim 23 wherein the fabric cord angle of the support sleeve is less than the fabric cord angle of the air spring member outer wall.

25. The suspension device as specified in claim 24 wherein the fabric cord angle of the support sleeve is approximately 20 degrees.

26. The suspension device as specified in claim 24 wherein the fabric cord angle of the air spring member is approximately 60 degrees.

27. The suspension device as specified in claim 18 including piston means adapted about the upper circumference of the rigid tubular member over the second fastener means to define a varying diameter for receiving the rolling lobe portion.

28. The suspension device as specified in claim 27 wherein the piston means is formed from a hard plastic material.

29. The air adjustable suspension spring and damper as specified in claim 19 wherein the first and second tubular sleeves are formed from corded elastomeric materials.

30. The air adjustable suspension spring and damper as specified in claim 29 wherein the cord angle of the first tubular sleeve is greater than the cord angle of the second tubular sleeve.

31. The air adjustable suspension spring and the suspension spring damper as specified in claim 20 including:

(a) a rod guide for the piston rod mounted in an upper end of the support tube means, the rod guide having a bore therein to slidably receive the piston rod means, and (b) a rod guide bearing fitted in the rod guide, having a cylindrical central section and upper and lower conical end sections, the upper and lower end sections extending from communication under the central section to enlarged diameter openings to receive and support the piston rod means during a rocking movement thereof relative to the rod guide.

32. The air adjustable suspension spring and suspension sprig damper as specified in claim 20 including:
 (a) a skirt-like annular seal wrapper around the piston assembly, and
 (b) spring means disposed between the seal and the piston assembly for urging the seal outwardly for close sealing contact with an interior wall of the second tubular sleeve.

* * * * *